United States Patent
Plough

(10) Patent No.: US 9,323,236 B2
(45) Date of Patent: Apr. 26, 2016

(54) FUZZY CONTROLS OF TOWED OBJECTS

(71) Applicant: AAI Corporation, Hunt Valley, MD (US)

(72) Inventor: Matthew Hewit Plough, Ellicott City, MD (US)

(73) Assignee: AAI Corporation, Hunt Valley, MD (US)

( * ) Notice: Subject to any disclaimer, the term of this patent is extended or adjusted under 35 U.S.C. 154(b) by 617 days.

(21) Appl. No.: 13/716,850

(22) Filed: Dec. 17, 2012

(65) Prior Publication Data

US 2014/0172173 A1 Jun. 19, 2014

(51) Int. Cl.
*G05B 15/02* (2006.01)
*G05B 13/02* (2006.01)

(52) U.S. Cl.
CPC .............. *G05B 15/02* (2013.01); *G05B 13/024* (2013.01)

(58) Field of Classification Search
CPC ............................... G05B 15/02; G05B 13/024
See application file for complete search history.

(56) References Cited

U.S. PATENT DOCUMENTS

| | | | |
|---|---|---|---|
| 3,656,095 A | 4/1972 | Cavey | |
| 3,987,745 A | 10/1976 | Chaverebiere de Sal et al. | |
| 4,248,394 A * | 2/1981 | Klumpp | B64D 3/00 244/16 |
| 4,586,452 A | 5/1986 | Lapetina et al. | |
| 4,754,442 A * | 6/1988 | Baker | B63G 8/42 114/254 |
| 5,110,310 A | 5/1992 | Hobbs | |
| 5,381,909 A * | 1/1995 | Warnan | B66C 13/02 114/244 |
| 5,570,303 A * | 10/1996 | Dessureault | 702/3 |
| 7,804,738 B2 | 9/2010 | Storteig et al. | |
| 7,822,552 B2 | 10/2010 | Bittleston | |
| 7,942,051 B2 * | 5/2011 | Bryn | B63G 8/001 73/170.29 |
| 8,267,031 B2 * | 9/2012 | Austad | G01V 1/38 114/244 |
| 2006/0027155 A1* | 2/2006 | Welch | B63B 35/816 114/254 |
| 2007/0242134 A1* | 10/2007 | Zernov | H04N 7/185 348/81 |
| 2010/0128561 A1* | 5/2010 | Meldahl | G01V 1/3826 367/16 |
| 2010/0185346 A1* | 7/2010 | Surmont | B64B 1/06 701/4 |
| 2010/0224843 A1* | 9/2010 | Christensen | B63B 35/816 254/271 |
| 2011/0133023 A1* | 6/2011 | Surmont | B64B 1/50 244/33 |
| 2012/0043089 A1* | 2/2012 | Hoffman | E21B 3/064 166/340 |
| 2012/0160143 A1* | 6/2012 | Bailey | B63B 21/66 114/61.1 |

OTHER PUBLICATIONS

International Search Report issued in PCT/US13/72840 dated May 15, 2014.

(Continued)

*Primary Examiner* — Ramesh Patel
(74) *Attorney, Agent, or Firm* — Venable LLP; Jeffri A. Kaminski; Todd R. Farnsworth

(57) ABSTRACT

A fuzzy logic controller for controlling towed objects includes comprises a winch controller to control extension or retraction of a tow cable based on a control signal. A fuzzy logic controller controls a speed at which the tow cable is extended or retracted. The fuzzy logic controller includes an altitude controller storing a membership function defining ranges for a delta altitude variable and determines an altitude control signal based on the range for the measured delta altitude variable. A gain controller stores respective membership functions defining ranges for speed, heading rate, and cable length variables and determines a gain control signal based on the ranges for the determined speed, heading rate, and cable length variables. A command controller determines the control signal based on the gain control signal and the altitude control signal.

15 Claims, 10 Drawing Sheets

(56) References Cited

OTHER PUBLICATIONS

Lee, Chun-Woo, et al., "Simplified Trawl System Modeling and Design of a Depth Control System using Fuzzy Logic", Fisheries Research 53, 2001, pp. 83-94 [online].

Dattahereya, Macam S, et al., "A Novel Approach for Combat Vehicle Mobility Definition and Assessment", Sep. 30, 2011, [online].

* cited by examiner

FUZZY CONTROLS OF TOWED OBJECTS

CROSS REFERENCE TO RELATED APPLICATIONS

This application is a Continuation Application of U.S. application Ser. No. 13/705,253, filed Dec. 5, 2012, all of which is hereby incorporated by reference in its entirety.

BACKGROUND

Embodiments of the present invention relate generally to new and useful improvements in control of towed objects, and in particular control of the altitude of a passive towed object.

Towed objects may be divided into two classes, those capable of actively controlling their own attitude, and those with no control surfaces or actuators of their own. Members of the active class include remotely operated vehicles (ROVs), unmanned underwater vehicles (UUVs), and piloted ships being towed. Members of the passive class are just as diverse, and include fishing gear, camera sleds, side scan sonars, and disabled ships and hulks.

Actively controlled ROVs have a well-established set of control methodologies based on conventional control theory. Control techniques are diverse, and include standard proportional, integral, derivative (PID) methods as well as more advanced techniques involving sliding mode control, LQG/LTR, fuzzy logic, and hybrid techniques.

Passive objects, which have no control surfaces or actuators of their own, are generally launched, towed, and retrieved manually by an expert crew. An expert crew, rather than some form of control system, is the state of the art. Traditional control techniques require an accurate, quantitative model of the system to be controlled. Such models normally consist of a set of transfer functions in the s-domain or a set of coupled differential equations. Often, the form of the model is known and the model's parameters must be determined using a system identification procedure. However, models of passive towed objects are normally unavailable. Model data may be proprietary or worse, performing system identification may not be cost-effective even for the equipment's original manufacturer.

Nevertheless, expert crews successfully tow passive objects on a regular basis. However, the current state of the art requires that an expert crew must be present during tow operations. Such a crew must be trained and must practice their skills in order to remain proficient. Furthermore, towing an object for mine hunting purposes places the crew in danger while requiring them to perform a dull and repetitive task. A manned presence also imposes infrastructure requirements—a mine hunting vessel must be large enough to house the crew and support life for weeks at a time.

In short, there exists a need in the art for an automated control system for passive towed objects.

SUMMARY

According to an embodiment, a fuzzy logic controller for controlling towed objects, comprises a winch controller to control extension or retraction of a tow cable based on a control signal; a fuzzy logic controller coupled to the winch controller to control a speed at which the tow cable is extended or retracted, the fuzzy logic controller including: an altitude controller storing a membership function defining ranges for a delta altitude variable and to determine an altitude control signal based on the range for the measured delta altitude variable; a gain controller storing respective membership functions defining ranges for speed, heading rate, and cable length variables and to determine a gain control signal based on the ranges for the determined speed, heading rate, and cable length variables; and a command controller to determine the control signal based on the gain control signal and the altitude control signal.

This summary is provided merely to introduce certain concepts and not to identify any key or essential features of the claimed subject matter. Further features and advantages of embodiments of the invention, as well as the structure and operation of various embodiments of the invention, are described in detail below with reference to the accompanying drawings.

BRIEF DESCRIPTION OF THE DRAWINGS

The foregoing and other features and advantages of embodiments of the invention will be apparent from the following, more particular description of embodiments of the invention, as illustrated in the accompanying drawings wherein like reference numbers generally indicate identical, functionally similar, and/or structurally similar elements. Unless otherwise indicated, the accompanying drawing figures are not to scale.

FIG. 3 FIG. 3a-c illustrate the results of a simulation of the control system according to an embodiment of the present invention;

DETAILED DESCRIPTION

Various embodiments of the invention are discussed herein. While specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose.

Figure 1:
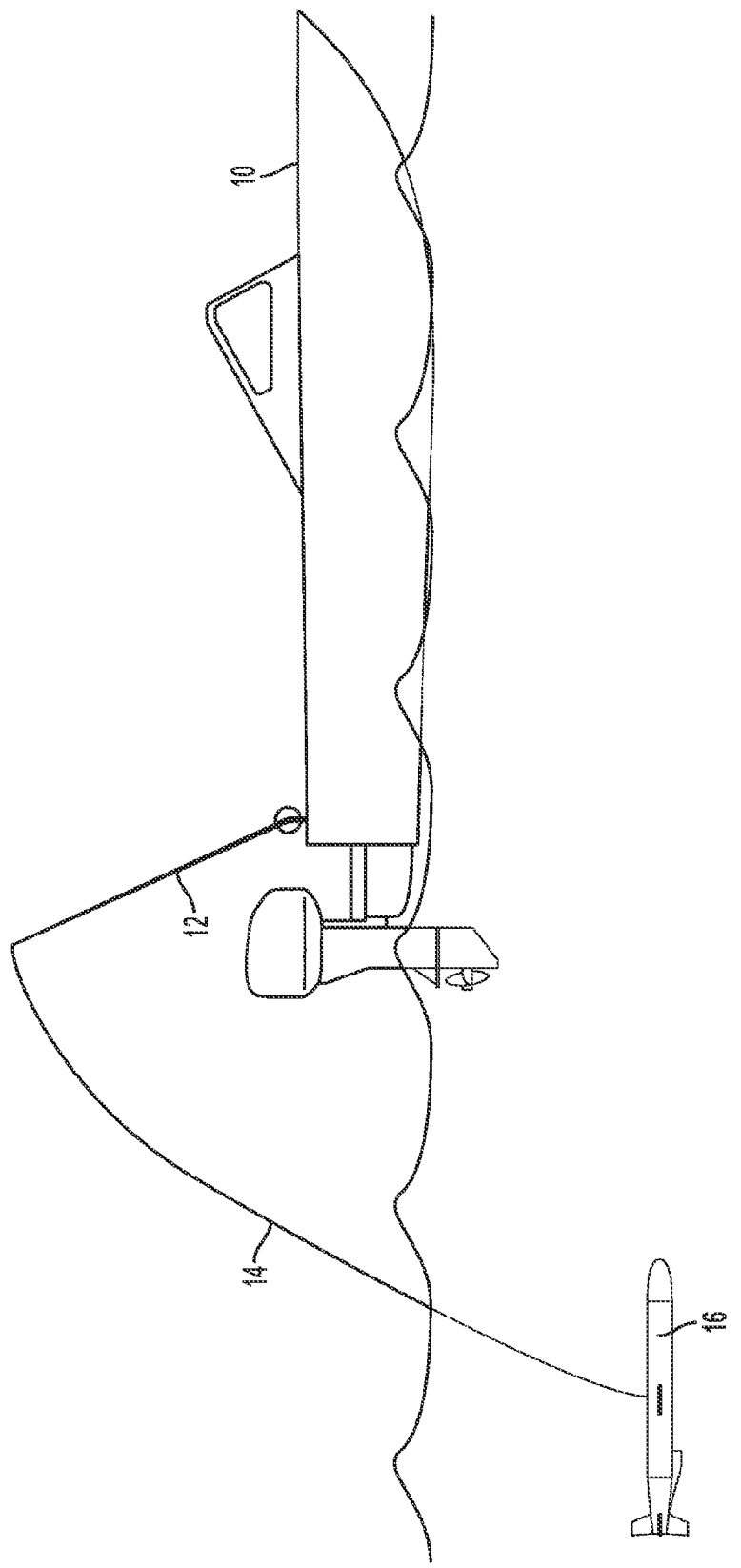
FIG. 1 depicts an example of a towed sonar configuration according to an embodiment of the present invention.

Referring to the drawings, there is shown in FIG. 1 a vessel 10 towing an object 16. The vessel may be a ship having a crew, an unmanned vessel such as a Common Unmanned Surface Vessel, or other marine vessel. The object 16 may be any towed object, such as fishing gear, camera sleds, side scan sonars, and the like. A winch assembly 12 is used to raise and lower the towed object via tow cable 14. The altitude and/or depth of the towed object in the water is controlled by taking in or letting out the tow cable 14 line via the winch assembly 12. An actuator 18 may be provided to control the operation of the winch assembly 12.

Embodiments of the invention are described herein in the context of towed sonar. However a control system for towing any appropriate object is within the scope of the invention.

Applications of maritime towing are common and diverse in both the civilian and military realms. Applications include fishing, search and rescue, salvage, launch and retrieval of smaller vessels, towing of disabled ships, mine warfare, and bottom survey.

Embodiments of the invention use a fuzzy logic controller to maintain proper towing conditions. Fuzzy logic can accommodate uncertainty both in the system state and in the action to be taken.

During tow operations, a side scan sonar should be maintained at a fixed altitude above the sea floor while being pulled forward at a constant speed. Since the towing vessel 10 may be small, it is more susceptible to environmental disturbances. Vessel motions can affect tow body motions, so precise altitude control is imperative.

The sonar 16 is typically pulled in a pre-planned search grid, so alteration of vessel speed and course is not an acceptable method to control sonar altitude. Therefore, the altitude must be controlled by using the winch assembly 12 to retract or extend the tow cable 14.

However, if the tow object 16 is dropped onto the sea floor and then dragged, it may be destroyed. If loss of the tow object 16 is imminent, deviating from a pre-planned speed and course is an acceptable method of altitude control.

In an exemplary embodiment, the control system may include contains two components. Altitude or depth may controlled by extending and retracting a tow cable.

In a situation where it is not possible to maintain altitude by retracting the tow cable, the winch control may request full speed ahead from the speed control. If it safe to proceed at full speed, the speed control grants the request.

The effect of several variables on tow body altitude is known qualitatively. A first of these variables is vessel speed. When the vessel 10 is stopped, the sonar 16 hangs directly below the tow point, assuming that the current does not push it one way or another. As the vessel speed increases, the tow cable 14 streams farther behind the vessel 10. The cable scope, that is, the ratio between the length of the tow cable 14 and the depth of the sonar 16, increases. At speed, the tow object 16 changes depth more slowly.

A second variable is tow cable length. As the cable length increases, more tow cable 14 must be extended or retracted to cause an equal change in depth of the tow object 16.

A third variable is delta altitude. If the altitude of the tow object 16 is too high, that is, the tow object 16 is being lowered to depth, the tow cable 14 should be extended as fast as possible. If the altitude is dangerously low, the tow cable 14 should be raised as fast as possible.

A fourth variable is ship heading rate. When the vessel turns, the tow object 16 follows a shorter path than the vessel, in the same fashion as the wheels of a trailer towed behind a truck. As a result, the tow object 16 and tow cable 14 experience lower drag forces and the altitude drops.

In a further embodiment, if the winch bandwidth is exceeded and the altitude is dangerously low, a full speed request may be issued to the speed controller.

The system may include sensors to measure and/or determine these variables. For example, the ship speed and the ship heading rate may be determined from the ship control system. The towed object may include a sensor to sense its altitude. The tow object may include a communications device to transmit the sensed altitude to the control system. The winch assembly may include a controller that measures how much tow cable is extended to determine the cable length. These sensors may transmit the sensed information to the fuzzy control system.

In one embodiment, the fuzzy control system may determine whether to extend or retract the tow cable based on the various input variables. The control system may identify the relevant inputs and outputs. The inputs and outputs may vary depending on the particular implementation, such as the winch assembly. Membership functions for the variables and a set of control rules are defined. The membership functions may classify the variable into different categories. The rules are applied based on the category of the variable and a control signal generated to control the process.

Figure 2:
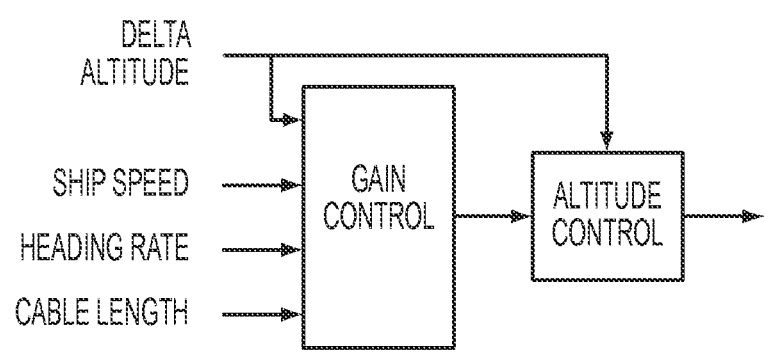
FIG. 2 depicts a block diagram of a fuzzy control system according to an embodiment of the present invention.

Referring now to FIG. 2 an exemplary system architecture is shown. A gain control 20 may be coupled to communication lines (wired or wireless) to receive information. The gain control 20 includes inputs 21-24, respectively, for receiving information regarding the input variables, for example, delta altitude, ship speed, ship heading rate, and cable length variables. Some or all of these variable may be used in various embodiments of the invention.

None of these variables affect the altitude directly. Instead, they affect the rate at which the altitude changes given a fixed change in the cable length, and can be used to implement a gain schedule. The gain schedule is implemented by the gain controller 20. An altitude control 26 is coupled to the gain controller 20 and receives a gain output from the gain controller 20. The altitude controller 26 also receives the delta altitude variable information. The altitude controller 26 uses this gain and the delta altitude to set the speed at which the tow line should be extended or retracted.

The gain controller 20 and altitude controller 26 may be implemented via a microchip controller, a feedback controller and the like. Rules may codify how the gain controller 20 and the altitude controller 26 should compensate for the effects of ship speed, heading rate, and cable length, while maximizing the rate of deployment. Exemplary rules for programming the gain controller and altitude controller are shown below.

```
if (DeltaAltitude is PlentyMargin): Gain is
    High
else if (DeltaAltitude is TooLow): Gain is
High
else:
    if (Speed is Slow) and (CableLength is
    Short):
        Gain is Low
    if (Speed is Slow) and (HeadingRate is
    Short):
        Gain is Low
    if (Speed is Fast) and (HeadingRate is
    Fast): Gain is High
    if (Speed is Fast) and (CableLength is
    Long): Gain is High
    if (HeadingRate is Slow) and
    (CableLength is Long): Gain is
    Medium
    if (Speed is Slow) and (HeadingRate is
    Slow) and (CableLength is Medium):
        Gain is Low
    if (Speed is Slow) and (HeadingRate is
    Fast) and (CableLength is Short):
        Gain is Low
    if (Speed is Slow) and (HeadingRate is
    Fast) and (CableLength is Medium):
        Gain is Medium
    if (Speed is Medium) and (HeadingRate is
    Slow) and (CableLength is Medium):
        Gain is Medium
    if (Speed is Medium) and (HeadingRate
    is Fast) and (CableLength is Short):
        Gain is Medium
    if (Speed is Medium) and (HeadingRate
    is Fast) and (CableLength is Medium):
```

Figure 4:
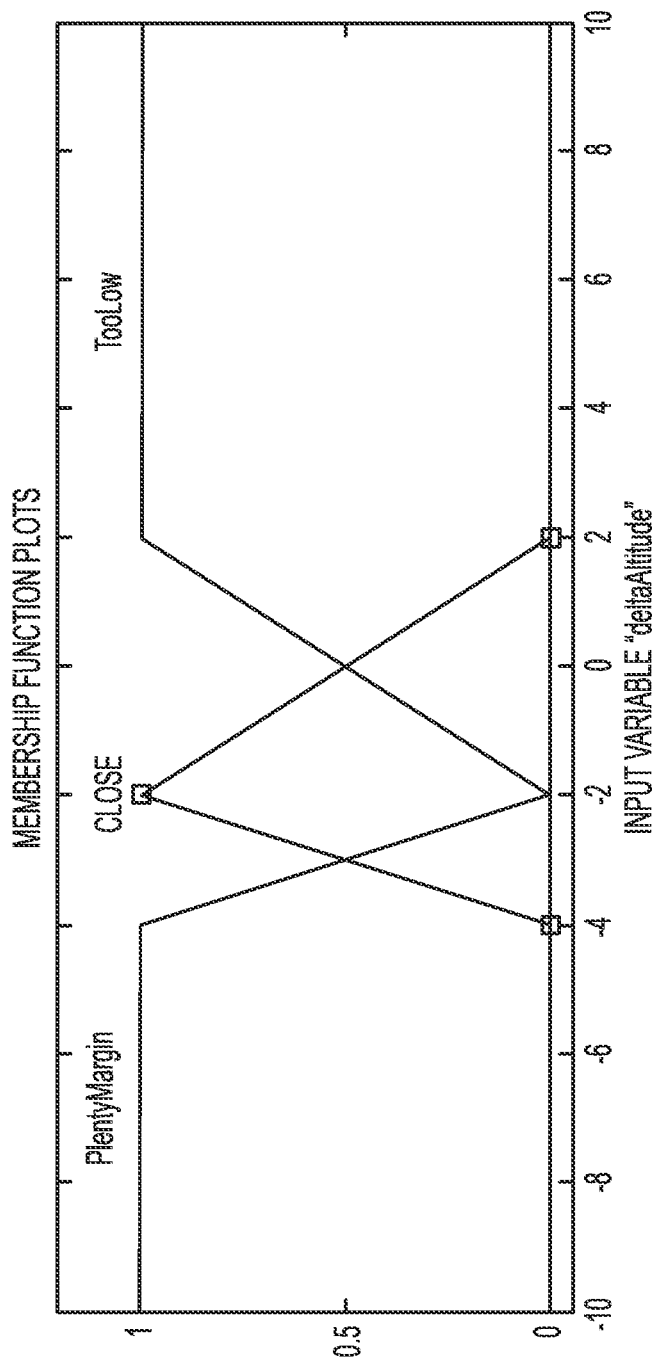
FIGS. 4-8 illustrate examples of membership functions according to an embodiment of the present invention.
Figure 5:
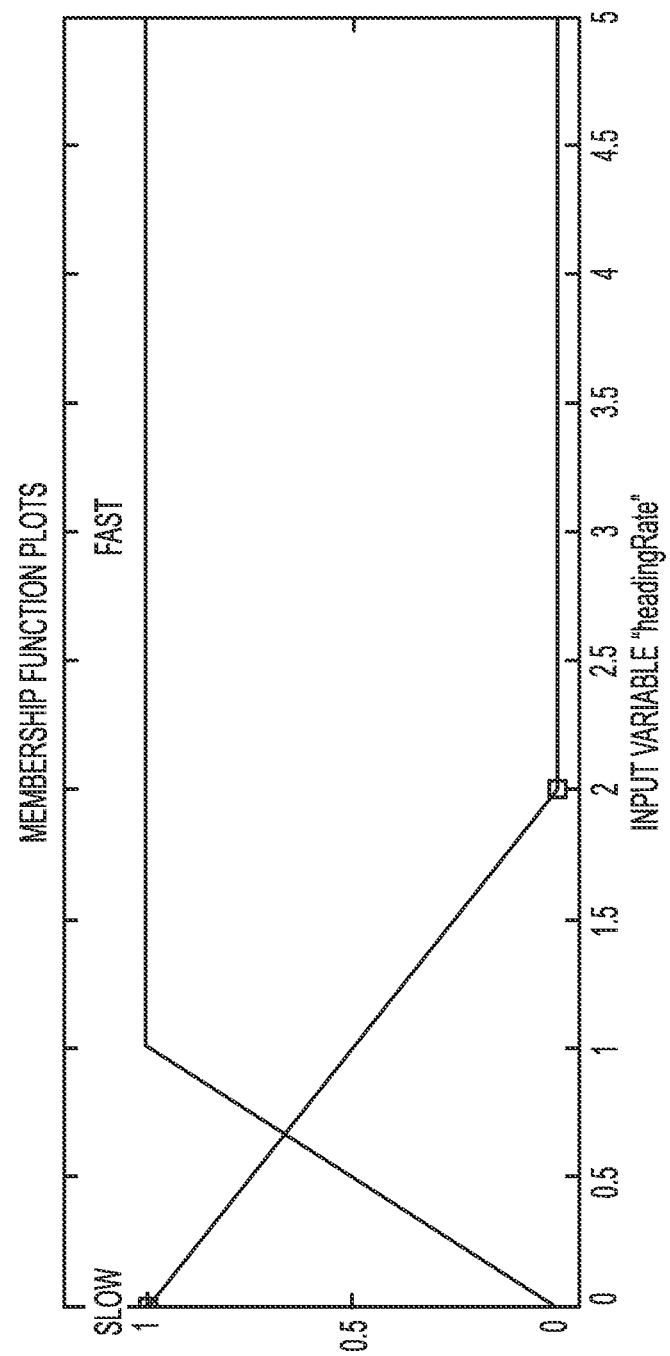
Figure 6:
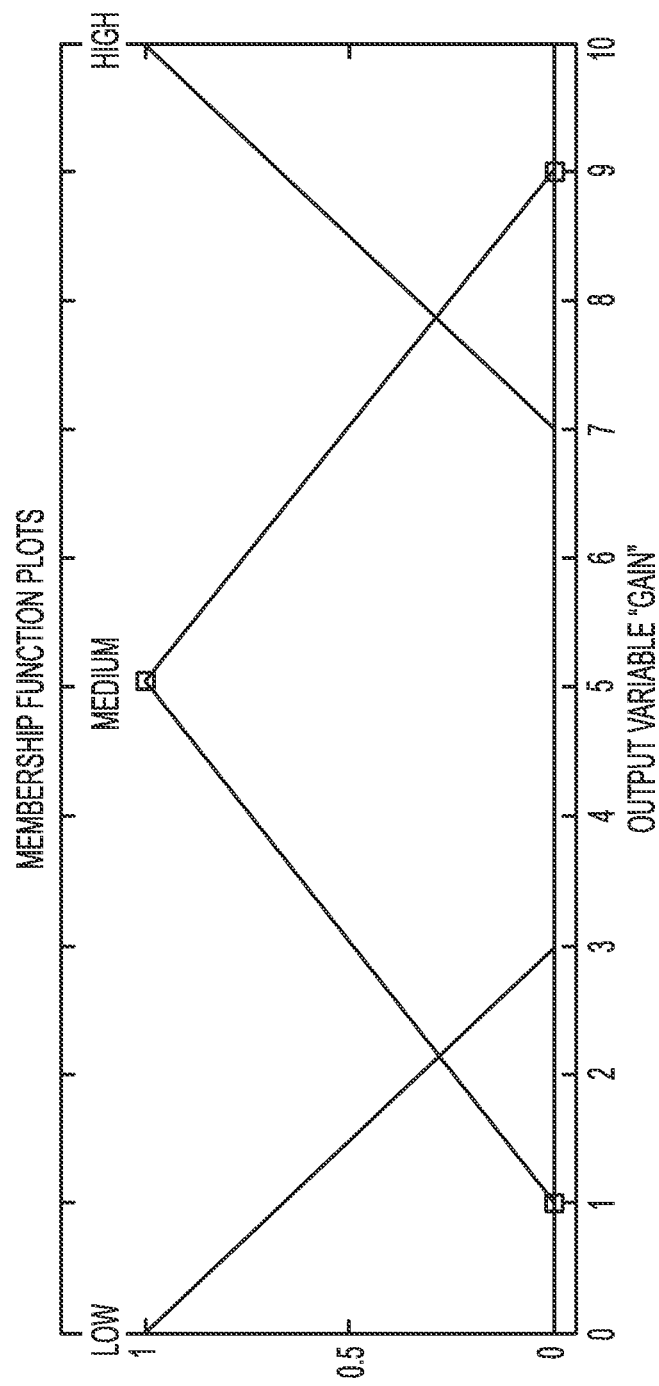

```
                Gain is High
    if (Speed is Fast) and (HeadingRate is
    Slow) and (CableLength is Medium):
                Gain is Medium
    if (Speed is Medium) and (HeadingRate
    is Fast) and (CableLength is
    Medium): Gain is Medium
Figure 4: Rules for the gain controller
if (DeltaAltitude is WayDeep):
    LineSpeed is FastRetract
if (DeltaAltitude is Deep):
    LineSpeed is Retract
if (DeltaAltitude is Correct):
    LineSpeed is Stop
if (DeltaAltitude is Shallow):
    LineSpeed is Extend
if (DeltaAltitude is WayShallow):
    LineSpeed is FastExtend
```

Figure 3A:
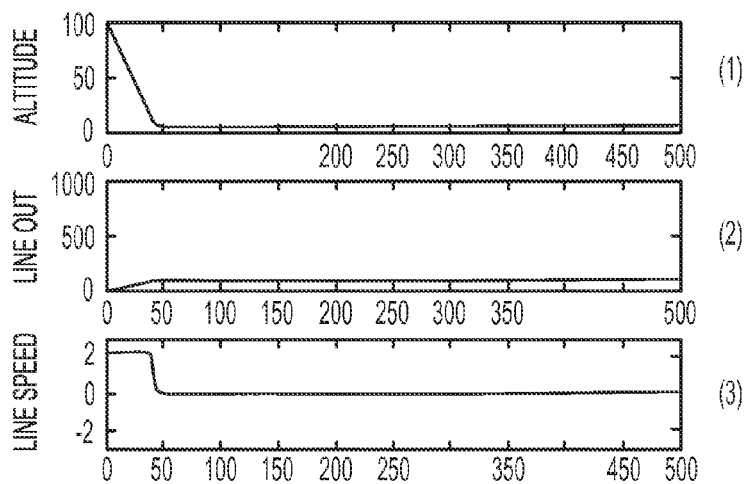
Figure 3B:
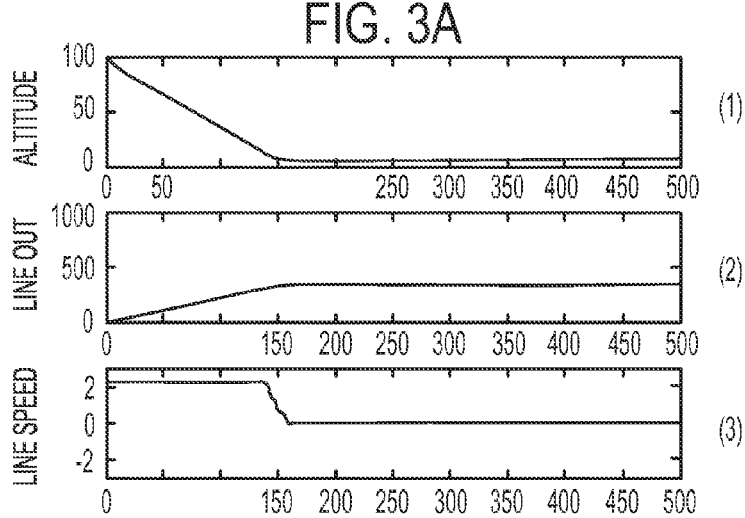
Figure 3C:
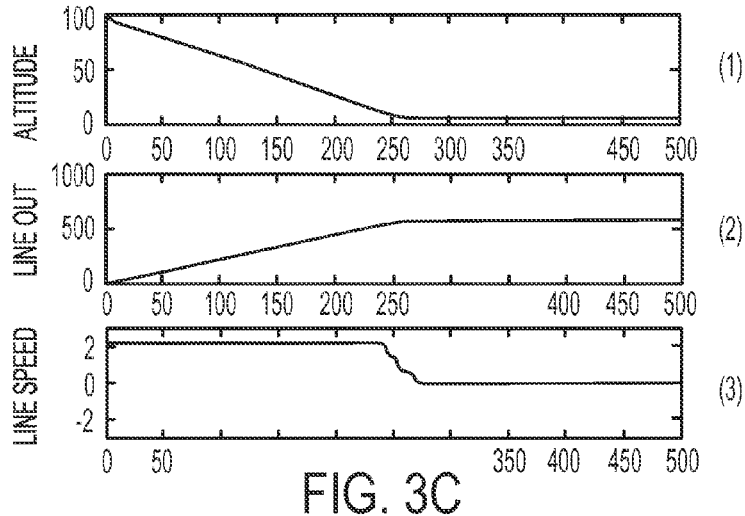

FIG. 3a-c illustrate the results of a simulation of the control system. The lowering of the tow object to a depth of five meters in 100 meters of water is simulated. The lowering is done at a constant speed of the tow vessel. FIG. 3a illustrates the results with the tow vessel speed at 0 knots, FIG. 3b illustrates the simulation results with the tow vessel speed at 5 knots, and FIG. 3c illustrates the simulation results with the tow vessel speed at 10 knots.

There are three graph for each speed. Graph 1 illustrates the altitude with respect to time, graph 2 illustrates the amount of tow cable out with respect to time, and graph 3 illustrates the line speed with respect to time.

FIGS. 3a-3c demonstrates that the controller establishes and maintains tow object altitude when the vessel drives in a straight line at constant speed. In all cases the altitude is maintained correctly with minimal control effort. The effect of ship speed on cable scope is readily apparent, as more cable is required to maintain depth as ship speed increases. This can be seen from graphs 2 in FIGS. 3a-3b.

A membership function is provided for some or all of the above described variables. The membership functions define particular ranges for the variable. The membership function should be defined to cover the expected range of values for the input variable. The specific values of the membership functions will vary depending on the characteristics of the system, for example the winch characteristics, etc.

FIGS. 4-8 illustrate examples of membership functions. The membership functions are triangular of trapezoidal in shape. Different types of membership functions may also be used, such as S-shaped in order to obtain smoother transitions between ranges. Based on the value of the variable, it may be determined where in the membership function the value falls. The value may fall into areas where the is no overlap of the regions. If the value falls into an area where there is overlap between two regions, the uncertainty may be resolved using, for example, Mamdani's method for fuzzy inference.

The speed variable may have membership functions defining three different speeds: slow, medium, and fast. A first region with a speed between 0 knots and 2 knots is slow speed, 2.5 knots to 7.5 knots is medium speed, and 8 knots to 10 knots is fast speed. Similar processes may be carried out for the other membership functions.

The cable link membership functions may define three different ranges for the length of the tow cable, short, medium and long. The ship heading rate variable may have membership functions defining two ranges, slow and fast. The delta altitude variable may have membership functions defining two ranges.

The gain controller is configured to determine a gain based upon the values of the variables. For example, the gain controller may include a module to determine in which range a variable is in based on the respective membership functions. For example, based on the inputs to the gain control, the first module may determine that the speed is medium the heading rate is fast and the cable rate is medium. Utilizing the rules for the gain controller described above, the gain would then be determined based on these inputs that the gain is medium. The appropriate gain signal is then output from the gain controller.

The altitude controller implements the memberships functions in similar fashion. The altitude controller may store membership functions defining its input variable into ranges. For example, the delta altitude variable may have membership functions defining four different range, way deep, deep, correct, shallow, and way shallow. Based on the inputs the altitude controller may implement the above-reference rules to determine if the speed tow cable is fast retract, retract, stop, extend or fast extend. Based on this determination, a control signal is sent to an actuator for the winch to retract or extend the tow cable appropriately.

Figure 9:
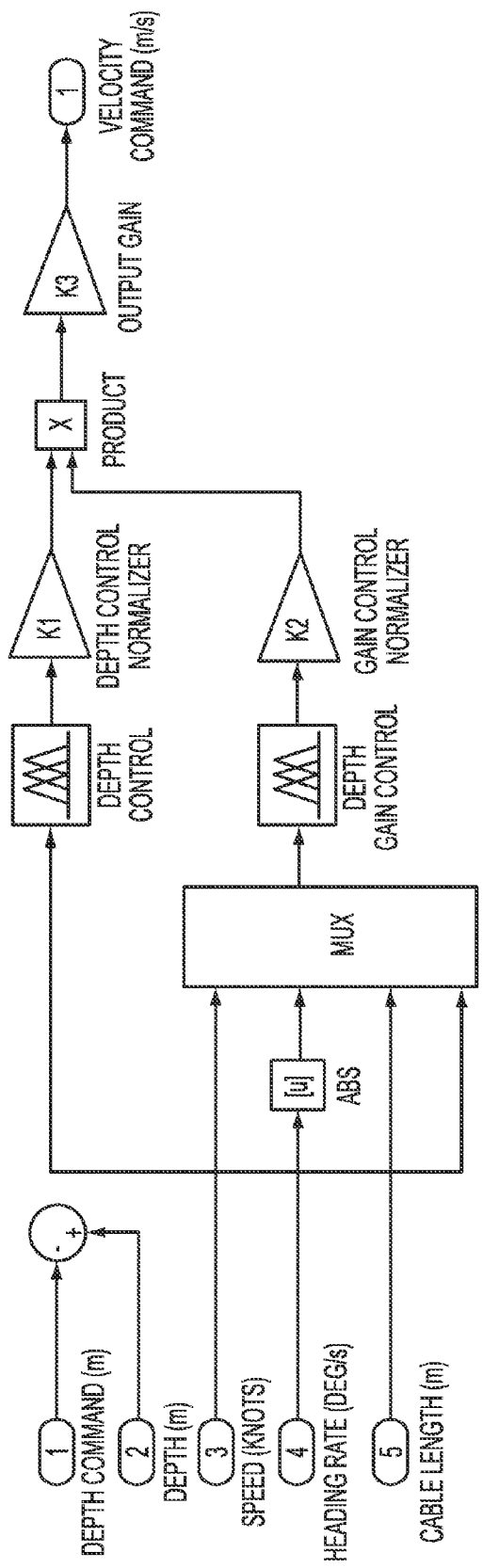
FIG. 9 depicts a block diagram of a fuzzy control system for altitude control, according to an embodiment of the present invention.

FIG. 9 is a more detailed illustration of a Fuzzy Control system according to an exemplary embodiment of the present invention. The altitude command is differenced with the current altitude to determine the delta altitude variable. The delta altitude variable is then input into the altitude control. An altitude control normalizer is also provided. The speed, absolute value of the heading rate and cable length variable are input to the altitude gain controlled. This may be done in some embodiments via a multiplexer, however this is not required. The output from the altitude gain controller is provided to gain control normalizer. When tuned correctly, the normalizers make the output of the product block range from −1 to 1, that is it act like a throttle. The output gain then converts that throttle to the correct units for the implementation, in this case meters per second.

Figure 10:
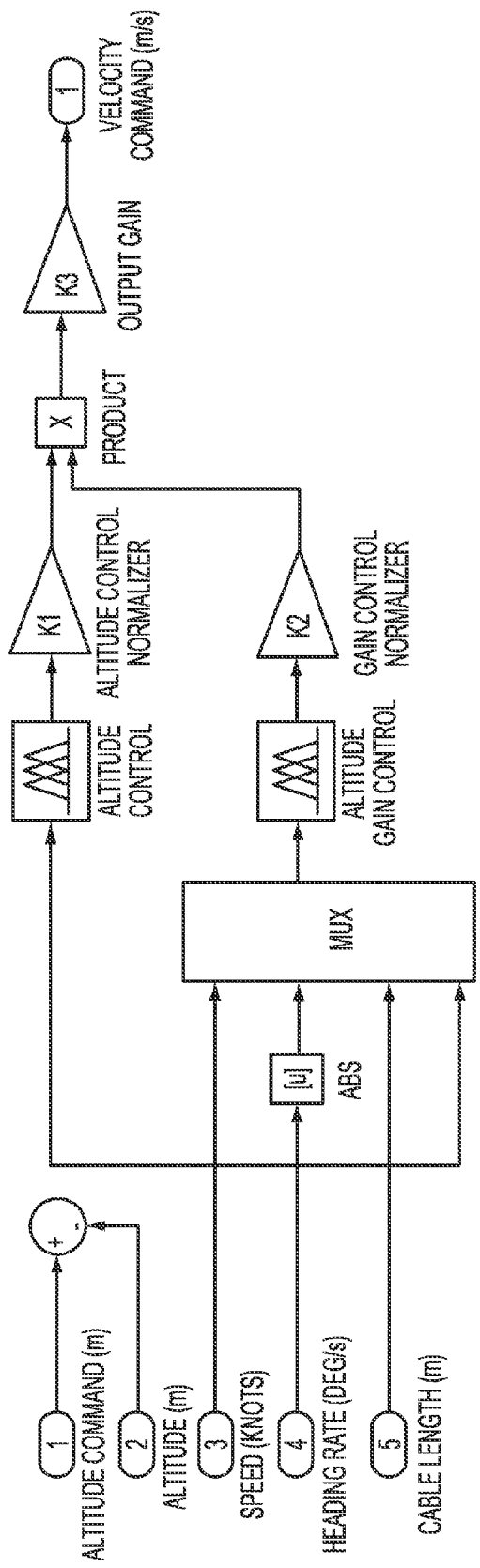
FIG. 10 depicts a block diagram of a fuzzy control system for altitude control, according to an embodiment of the present invention.

FIG. 10 illustrates an example of a depth control applying the same principles as the altitude control described above, except that depth is substituted for altitude.

Figure 7:
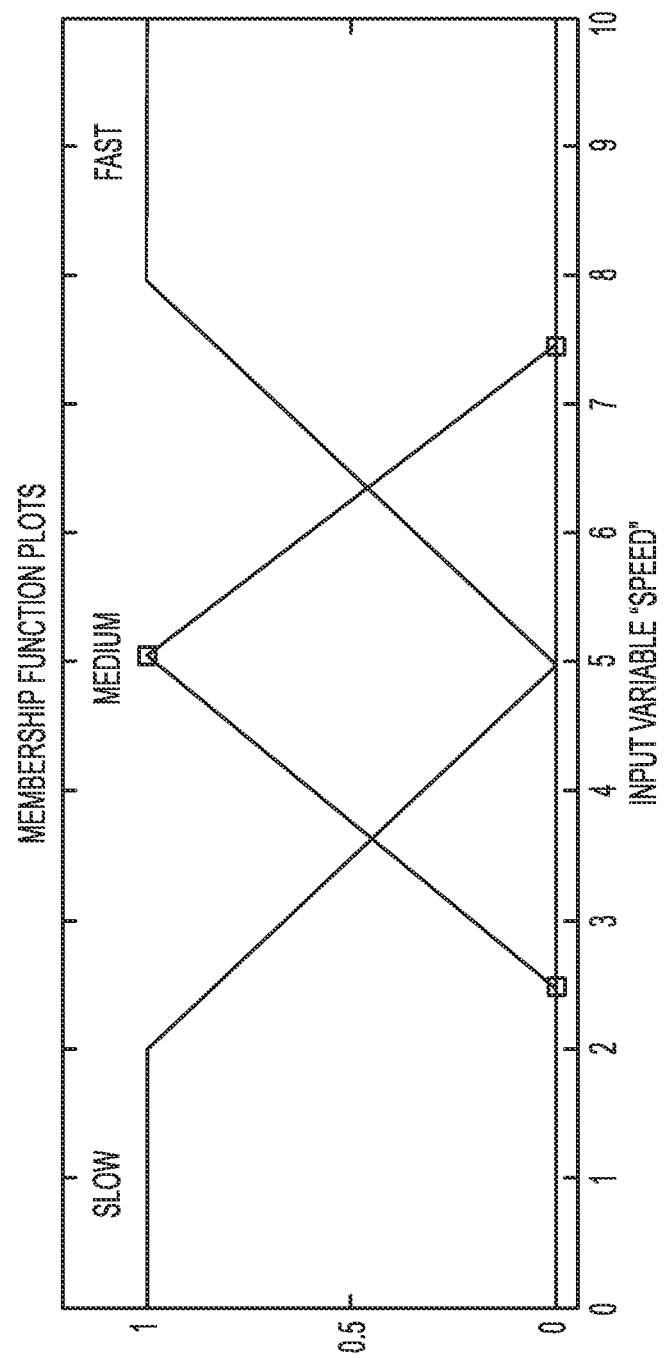
Figure 8:
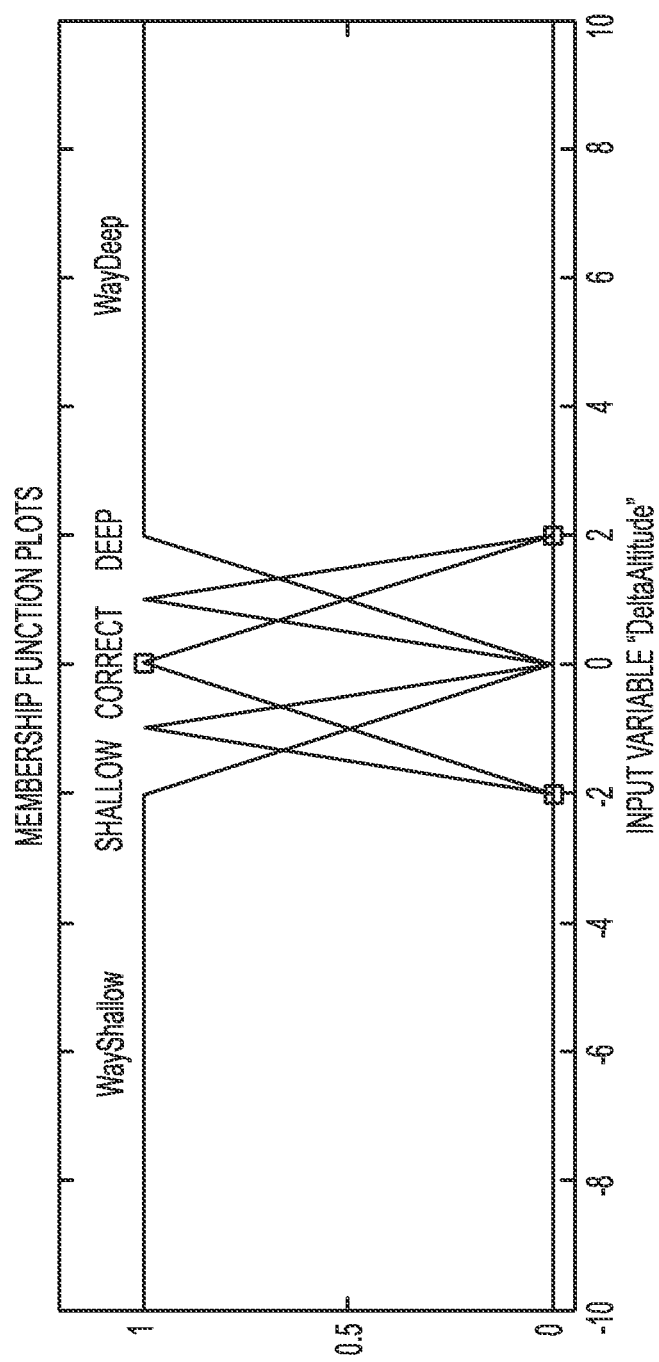

180-degree turns are of particular importance when following the "mowing the lawn" pattern of mine sweeping. A series of 180-degree turns of varying rates executed at constant speed are shown in FIG. 7. The controller maintains altitude at 1 deg/s and 2 deg/s, but at 4 deg/s the winch's rate limit is reached and the sonar is dropped at 255 seconds.

Fuzzy control has been demonstrated to be a viable, practical method for controlling the altitude and/or depth of a sonar. Nonlinear interaction of many variables dictate the system dynamics, and model data is usually unavailable. However, the ability to create a codify heuristics and intuition offers the possibility of controlling such a complex system in an efficient manner.

It will be understood that the above description of the present invention is susceptible to various modifications, changes and adaptations, and that the same are intended to be comprehended within the meaning and range of equivalents of the appended claims.

What is claimed is:

1. A controller for controlling objects towed by a vessel, comprising:
   a winch controller to control extension or retraction of a tow cable based on a control signal;
   a fuzzy logic controller coupled to the winch controller to control a speed at which the tow cable is extended or retracted, the fuzzy logic controller including:
      an altitude controller storing a membership function defining ranges for a delta altitude variable and to determine an altitude control signal based on the range for the measured delta altitude variable;

a gain controller storing respective membership functions defining ranges for speed, rate of turn of the vessel, and cable length variables and to determine a gain control signal based on the ranges for the determined speed, rate of turn of the vessel, and cable length variables; and a command controller to determine the control signal based on the gain control signal and the altitude control signal.

2. The controller of claim 1, wherein the fuzzy logic controller further comprises:

a speed sensor for sensing a speed of the vessel; and a cable length sensor to determine a length of the tow cable.

3. The controller of claim 1, wherein the fuzzy logic controller further comprises an altitude normalizer for normalizing the altitude control signal output of the altitude controller.

4. The controller of claim 1, wherein the fuzzy logic controller further comprises a gain normalizer for normalizing the gain control signal output of the gain controller.

5. The controller of claim 1, wherein the control signal is a product of the output of the gain control signal and the altitude control signal.

6. The controller of claim 1, wherein the fuzzy logic controller further comprises a control signal normalizer for normalizing the control signal.

7. The controller of claim 1, wherein the delta altitude variable defines a difference between a desired altitude and a measured altitude.

8. The controller of claim 1, wherein the fuzzy logic controller further comprises:

a speed controller, wherein when it is not possible to maintain an altitude of a towed object by retracting the tow cable, a full speed ahead request is made to the speed controller.

9. A method of fuzzy logic control of objects towed by a vessel, comprising:

determining ranges for a delta altitude, speed, rate of turn of the vessel, and cable length variables;

dividing the respective ranges into a plurality of regions defining respective membership functions;

measuring current values for each of the delta altitude, speed, rate of turn of the vessel, and cable length variables;

determining an altitude control signal based on the region of the membership function including the current values for the delta altitude variable;

determining a gain control signal based on the region of the membership function including the current values for the speed, rate of turn of the vessel, and cable length variables; and determining a control signal for a winch controller to control extension or retraction of a tow cable based on the altitude control signal and the gain control signal.

10. The method of claim 9 further comprising:

sensing a speed of the vessel with a speed sensor; and determining a length of the tow cable with a cable length sensor.

11. The method of claim 9 further comprising normalizing the altitude control signal output of the altitude controller.

12. The method of claim 9 further comprising normalizing the gain control signal output of the gain controller.

13. The method of claim 9 further wherein the control signal is a product of the output of the gain control signal and the altitude control signal.

14. The method of claim 9 further comprising normalizing the control signal.

15. The method of claim 9, further comprising:

requesting full speed ahead when it is not possible to maintain an altitude for a towed object and a winch bandwidth has been exceeded.

* * * * *

UNITED STATES PATENT AND TRADEMARK OFFICE
CERTIFICATE OF CORRECTION

PATENT NO. : 9,323,236 B2
APPLICATION NO. : 13/716850
DATED : April 26, 2016
INVENTOR(S) : Matthew Hewit Plough It is certified that error appears in the above-identified patent and that said Letters Patent is hereby corrected as shown below:

Related U.S. Application Data:

The "Related U.S. Application Data" information on the Title Page of the patent (63) is missing and should read "Continuation of Application No. 13/705,253, filed December 5, 2012"

Signed and Sealed this
Sixteenth Day of August, 2016

Michelle K. Lee
*Director of the United States Patent and Trademark Office*